(12) United States Patent
Powell et al.

(10) Patent No.: US 6,349,516 B1
(45) Date of Patent: Feb. 26, 2002

(54) FRAME ARRANGEMENT FOR A WALL PANEL SYSTEM

(75) Inventors: Mark A. Powell, West Olive; Peter J. Beyer; Richard G. Haworth, both of Holland, all of MI (US)

(73) Assignee: Haworth, Inc., Holland, MI (US)

( * ) Notice: Subject to any disclaimer, the term of this patent is extended or adjusted under 35 U.S.C. 154(b) by 0 days.

(21) Appl. No.: 09/326,192

(22) Filed: Jun. 4, 1999

(51) Int. Cl.⁷ .................................................. E04H 1/00
(52) U.S. Cl. ........................... 52/239; 52/36.1; 52/241; 52/242; 52/220.7; 52/481.2
(58) Field of Search .................... 52/36.1, 239, 241, 52/242, 243, 220.7, 481.2

(56) References Cited

U.S. PATENT DOCUMENTS

| | | |
|---|---|---|
| 3,152,670 A | 10/1964 | Selkregg, Jr. et al. |
| 3,695,456 A | 10/1972 | Lewis |
| 4,064,996 A | 12/1977 | Shillum |
| 4,198,913 A | 4/1980 | Haworth et al. |
| 4,342,397 A | 8/1982 | Halstrick |
| 4,391,073 A * | 7/1983 | Mollenkopf et al. .......... 52/241 |
| 4,437,278 A | 3/1984 | Thomas, Jr. |
| 4,625,483 A | 12/1986 | Zacky et al. |
| 4,631,881 A | 12/1986 | Charman |
| 4,794,744 A * | 1/1989 | Young et al. ............. 52/239 X |
| 5,155,955 A | 10/1992 | Ball et al. |
| 5,426,904 A | 6/1995 | Gilmore |
| 5,430,984 A * | 7/1995 | Young et al. ............. 52/239 X |
| 5,495,952 A * | 3/1996 | Kainz ....................... 52/239 X |
| 5,806,258 A | 9/1998 | Miedema et al. |
| 5,899,035 A | 5/1999 | Waalkes et al. |
| 6,047,508 A * | 4/2000 | Goodman et al. ............ 52/241 |
| 6,052,958 A * | 4/2000 | Miedema et al. ......... 52/239 X |

FOREIGN PATENT DOCUMENTS

| | | |
|---|---|---|
| EP | 050 241 A1 | 4/1982 |
| FR | 2 587 606 | 3/1987 |

* cited by examiner

Primary Examiner—Carl D. Friedman
Assistant Examiner—Brian E. Glessner
(74) Attorney, Agent, or Firm—Flynn, Thiel, Boutell & Tanis, P.C.

(57) ABSTRACT

A frame arrangement for use with an interior space-dividing wall system including portable upright panel assemblies. The frame arrangement includes upright post assemblies in supportive engagement with the floor and a cross members which extend laterally between adjacent pairs of the post assemblies. The cross member mounts thereon a cable trough which may be utilized to carry cabling and to support a power distribution assembly including electrical receptacles for providing the panel assemblies with electrical power. The cross member and cable trough are adapted to prevent rotation of the cable trough during insertion and removal of plugs or jacks from the receptacles.

12 Claims, 8 Drawing Sheets

FRAME ARRANGEMENT FOR A WALL PANEL SYSTEM

FIELD OF THE INVENTION

This invention relates to a frame arrangement for use in conjunction with a space-dividing wall system formed from upright serially-connected panels and, more specifically, to an improved frame arrangement for a wall panel system which supports a panel assembly and is adapted to support cabling and power distribution equipment.

BACKGROUND OF THE INVENTION

Commercial buildings typically include large open office areas which are divided into smaller work spaces or workstations by any of a number of panel systems that have been developed therefor. These panel systems typically employ upright space-dividing wall panels which serially connect together through two-panel straight or angled connections, or through suitable three or four-panel connections, to subdivide the office area into a plurality of smaller workstations of desired size and configuration. Such panels are typically less than floor-to-ceiling height, and cooperate with other furniture components to define an equipped workstation. These components may include worksurfaces, file cabinets, shelf units and the like which mount directly on and are supported by the wall panels, and may also include freestanding furniture components such as tables, chairs and file cabinets.

In the known panel systems, the individual panel assemblies have a variety of configurations. For example, in some arrangements, the individual panel assemblies are themselves supported directly in load-bearing relationship with a floor by support feet or glides which are mounted on horizontally extending bottom frame members incorporated into the panel assembly. In other arrangements, seriallyadjacent panel assemblies are interconnected through intermediate upright support posts or poles which bear the weight of the panels and in turn are maintained in load-bearing engagement with the floor. The present invention is an improved frame arrangement which is particularly suited for use with the latter-mentioned post-type panel arrangements, but may also be utilized with the former arrangement wherein the panel assemblies themselves are directly supported on the floor.

One type of frame arrangement for use with a spacedividing wall system including panel members supported by intermediate upright support posts is disclosed in U.S. Pat. No. 5,806,258 (hereinafter "258"), which is owned by the same Assignee hereof, and which is incorporated by reference herein in its entirety. The wall system disclosed therein employs both base panels supported by support post sections and one or more extension panel assemblies extending upwardly therefrom. The extension panels are supported vertically above the base panels by a cross member or rail arrangement which extends laterally between a pair of extension posts and is fastened thereto by bolts which cooperate with lugs mounted along the sides of the extension posts. This type of fastening of the cross member to the respective extension posts, however, can complicate the overall assembly process.

Accordingly, it is an object of the invention to provide an improved frame arrangement for a space-dividing wall system, which frame arrangement is desirable in that it is economical and simple to manufacture, and can be easily and readily assembled into a wall panel system.

Other objects and purposes of the invention, and variations thereof, will be apparent upon reading the following specification and inspecting the accompanying drawings.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 1:
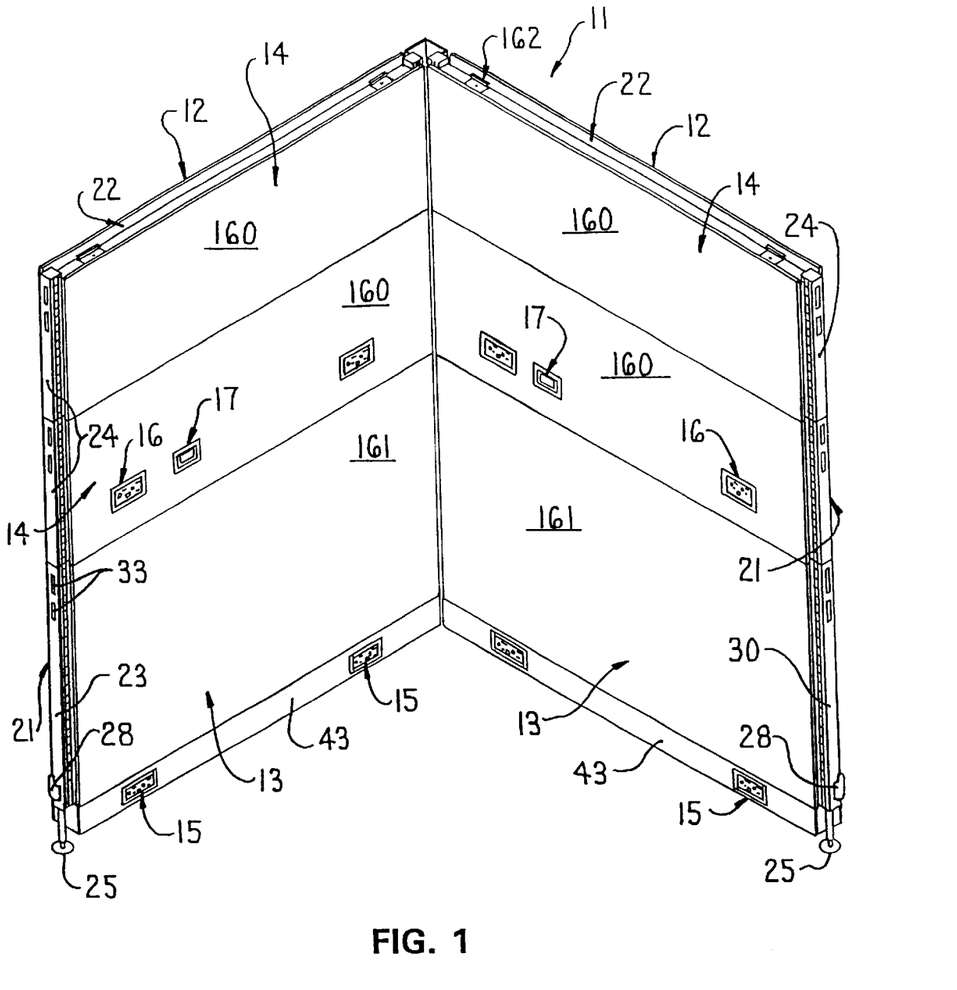
FIG. 1 is a perspective view illustrating a wall panel system according to the invention including base panel assemblies and panel extension assemblies in a right angle corner configuration.
Figure 2:
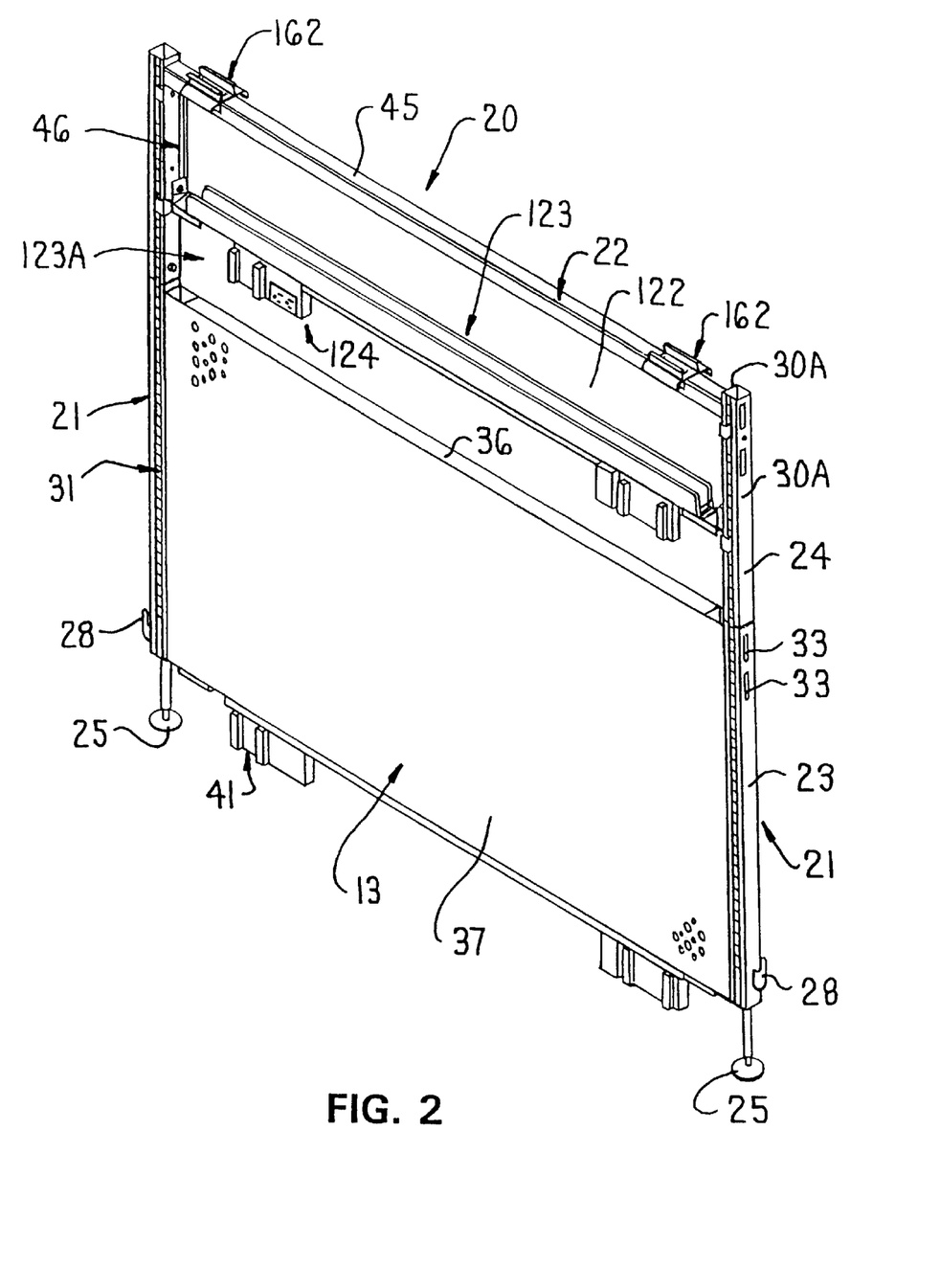
FIG. 2 is a perspective view illustrating one wall panel system without panel covers.

Referring to FIGS. 1 and 2, there is illustrated a wall panel system 11 which includes a pair of upstanding wall panel assemblies 12 serially connected in an angled or corner configuration so as to subdivide an office area into separate workstations (not shown). Each wall panel assembly 12, in the illustrated embodiment, at least includes a base panel assembly 13 supported on a floor which typically includes one or more modular extension panel assemblies 14 positioned vertically one above the other in a vertical plane.

Generally, a workstation is defined by a selected arrangement of the base panel assemblies 13 which are serially connected one with the other to form at least a lower section of a vertically extending wall. Besides selectively subdividing the office area by the placement of the base panel assemblies 13, the wall panel system 11 thereafter permits modular adjustment of the wall height by selective placement of one or more extension panel assemblies 14 vertically on each base panel assembly 13. In the illustrated arrangement, two extension panel assemblies 14 are vertically positioned or stacked, although additional extension panels are mountable one atop the other so as to have a vertical height which may extend close to a ceiling, if desired. Additionally, the wall panel assemblies 12 support office components such as shelf units, worksurfaces or other conventional furniture components (not shown) while additional freestanding components such as chairs, shelf units and cabinets (not shown) can be positioned within the workstation.

To accommodate additional workstation equipment (not shown) such as telephones, computers, facsimile machines and the like, the wall panel assemblies 12 also selectively include electrical receptacles 15 at a base raceway height, additional electrical receptacles 16 at a beltline height (for example above a typical worksurface) and further communication receptacles 17 for connection to modems or telephones.

The individual wall panel assemblies 12 have a frame structure 20 (FIGS. 2 and 3) including a pair of upright post assemblies 21 arranged on either side of the panel assembly 12 and a cross member 22 which extends laterally between each pair of post assemblies 21. FIG. 1 illustrates a pair of panel assemblies arranged in a corner configuration. Alternatively, a plurality of wall panel assemblies 12 may be serially connected in an end-to-end aligned relationship with one another, wherein each serially adjacent pair of the wall panel assemblies 12 are connected together by a common upright post assembly 21, so that each panel assembly 12 extends laterally and is supported at its opposite ends by two spaced apart post assemblies 21, with an intermediate one of the assemblies 21 being connected between a pair of the panel assemblies 12 (not shown here). Both of the above-discussed panel configurations are illustrated in '258.

As briefly discussed above, the wall panel assembly 12 at least includes the base panel assembly 13 and may also include a selected number of extension panel assemblies 14. In the illustrated embodiment, each post assembly 21 includes at least a lower support post 23 in load-bearing contact with the floor for connection to a base panel assembly 13, and optionally includes one or more extension panel posts 24 which removably connect to and extend vertically from the lower support post 23.

Each lower support post 23 (FIG. 3) is vertically elongate and has a disc-like glide 25 in supportive engagement with the floor. The glide 25 is in threaded engagement with an extension rod 26 which is of conventional construction for leveling the wall panel assemblies 12. The upper end of the extension rod 26 fixedly connects to a lower end of a square tubular section 27 which substantially defines the overall vertical length of the lower support post 23. The lowermost end of the tubular section 27 mounts thereon a pair of outwardly and upwardly projecting connector hooks 28. The tubular section 27 is formed from two identical U-shaped channel sections 30 nested or mated together (FIG. 3) and then fixedly joined by welding. The upper end of the support post 23 thereby opens upwardly from a hollow interior thereof.

To permit connection of furniture components or accessories to the post assemblies 21 on opposite facing sides of each wall panel assembly 12, each lower support post 23 includes a plurality of generally rectangular apertures 31. The apertures 31 are formed in opposite facing sides of the support post 23 and in particular, are vertically spaced along the longitudinal length thereof. More particularly, each aperture 31 is defined by corresponding openings formed through the channel sections 30 which are aligned with one with the other when the channel sections 30 are nested together. The apertures 31 accommodate hook-like projections on furniture component support brackets (not shown). This vertically spaced arrangement of apertures and hook-like projections is a conventional mounting arrangement used in wall panel systems and thus a more detailed description is believed unnecessary.

To connect the base panel assemblies 13 to the lower support post 23, the support post 23 also includes a plurality of generally rectangular openings 33 located in opposite outward facing sides of the support post 23 (i.e. on the sides of support post 23 unoccupied by apertures 31). The base assemblies 13 are fixed to the respective support posts 23 via panel locks which cooperate with openings 33 and via the connector hooks 28 formed at the lower end of support post 23. This panel-lock connection is disclosed in application Ser. No. 09/185 689 (hereinafter "'689"), entitled "POST-PANEL CONNECTOR ARRANGEMENT", which application is owned by the same Assignee hereof and is incorporated herein by reference in its entirety.

Figure 3:
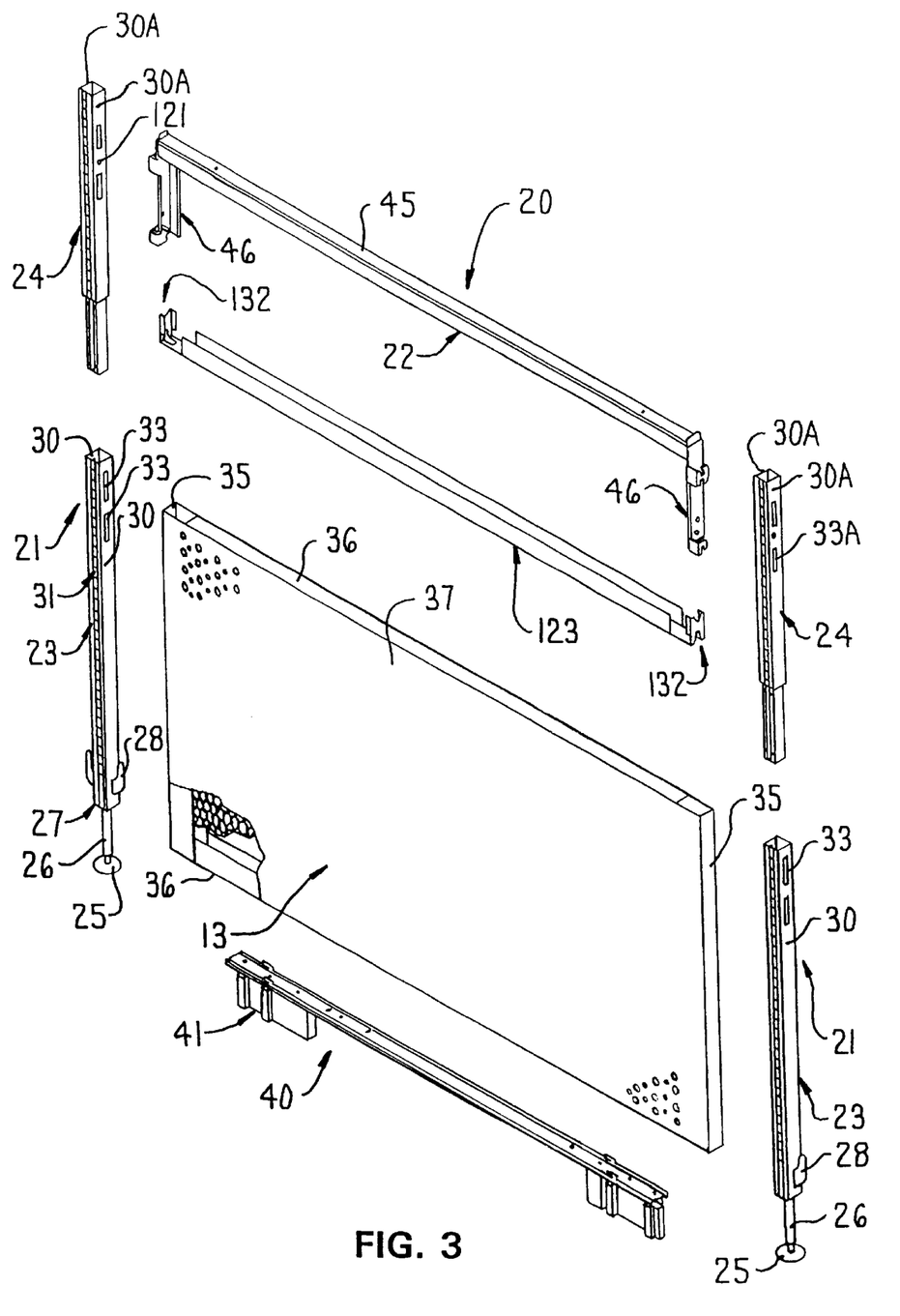
FIG. 3 is an exploded perspective view illustrating/the wall panel assembly of FIG. 2.
Figure 4:
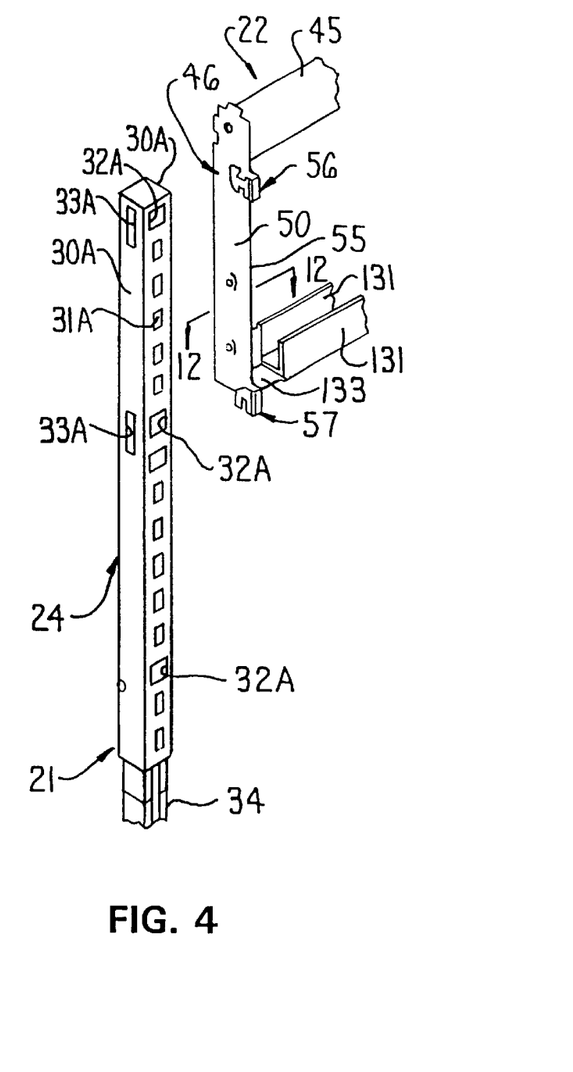
FIG. 4 is an enlarged, fragmentary exploded perspective view illustrating the connection between one end of a cross member and the extension post.

To allow for modular adjustment of the height of the wall panel assemblies 12, the open upper end of the support post 23 receives one extension post 24 coaxially inserted therein in a bayonet-like connection such that the extension post 24 extends upwardly therefrom. The post assembly 21 therefore may include at least one extension post 24 which is formed, like the support post 23, by a nested pair channel sections 30A (FIG. 3). The channel sections 30A also include apertures 31A and 32A and openings 33A (FIG. 4). Apertures 32A are slightly wider than the apertures 31A as shown in FIG. 4. In this regard, lower post 23 also includes enlarged apertures (not shown) arranged in a similar manner as the apertures 32A of post 24.

To removably connect the extension post 24 and the support post 23 together, an elongate bayonet-like connector 34 is fixed within the lower end of the extension post 24 and projects downwardly therefrom (FIG. 4). The lower end of the connector 34 is adapted to be slidably received within the open upper end of the lower support post 23 to provide the bayonet connection, and may include plastic spacers (not shown) on the lower end thereof to limit play. A bayonet connector of this type is disclosed in '258 and will therefore not be discussed in detail here. Since the extension posts 24 are open at the upper ends thereof, the connectors 34 of additional extension posts 24 can be inserted therein to further extend the height of the post assembly 21.

The base panel assembly 13 (FIGS. 2 and 3) which connects to the upright 21 is disclosed in the '258 patent and will therefore be only briefly discussed here. Base panel assembly 13 has a frame generally formed from two elongate vertical rails 35 which define laterally spaced apart ends of the base panel assembly 13, and two elongate horizontal rails 36 which define upper and lower base panel edges that extend laterally between the opposite panel ends. The rails 35 and 36 are joined with planar metal skins or surfaces 37 which define opposite outward facing side surfaces thereof. The vertical rails 35 are generally hollow and are adapted to receive therein a panel lock (not shown) for attaching the base panel assembly 13 to the respective support post 23 in a manner similar to that disclosed in '689.

When connected to the support posts 23, the base panel 13 is spaced vertically above the floor so as to define a horizontally elongate space therebetween which accommodates a raceway assembly 40 (FIG. 3). The raceway assembly 40 generally includes a power distribution assembly 41 (hereinafter "PDA"). The PDA 41 includes power blocks at opposite ends thereof adapted to carry electrical power therethrough. The PDA 41 is a commercially available product sold by the assignee for the PREMISE wall panel system, and thus a more detailed discussion thereof is not believed necessary. Power can be distributed at base height where needed, for example by connecting a receptacle 15 (FIG. 1) to a selected power block and then enclosing the raceways with appropriate raceway covers 43 formed with receptacle ports therethrough.

Once the base panel assemblies 13 are connected to support posts 23 such that a workstation is defined thereby, it may then be desirable to increase the height of the wall panel system 11 by the addition of extension panel assemblies 14. Each panel extension assembly 16 is formed by first inserting a pair of spaced apart extension posts 24 into the open upper ends of a spaced apart pair of serially adjacent lower support posts 23 as shown in FIGS. 2 and 3). The generally horizontally oriented cross member 22 of frame structure 20 is then provided so as to extend laterally between the pair of extension posts 24.

Figure 5:
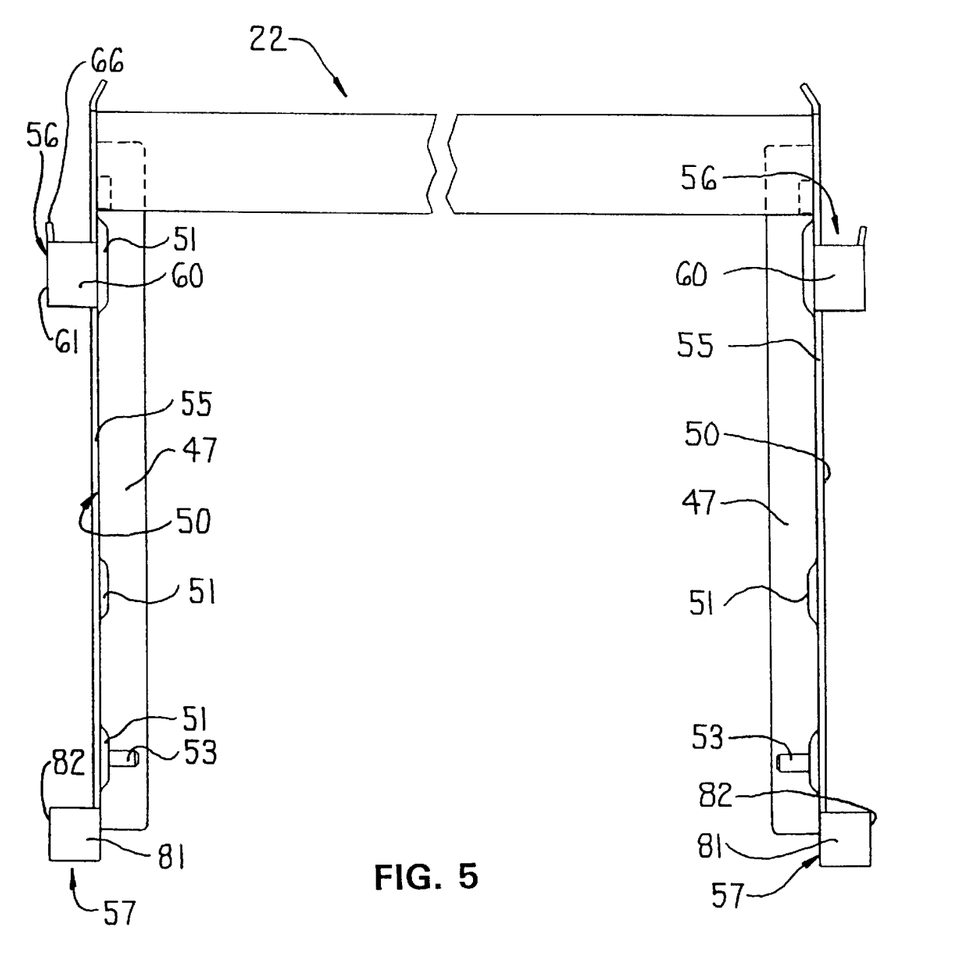
FIG. 5 is an enlarged, fragmentary front view of the cross member.
Figure 6:
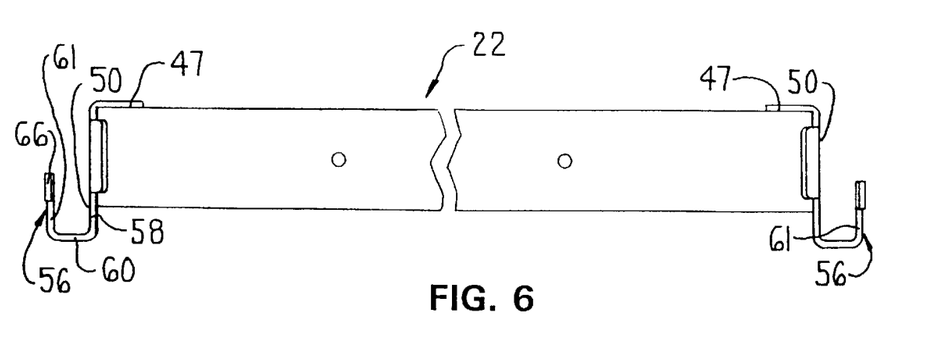
FIG. 6 is an enlarged fragmentary plan view of the cross member.
Figure 7:
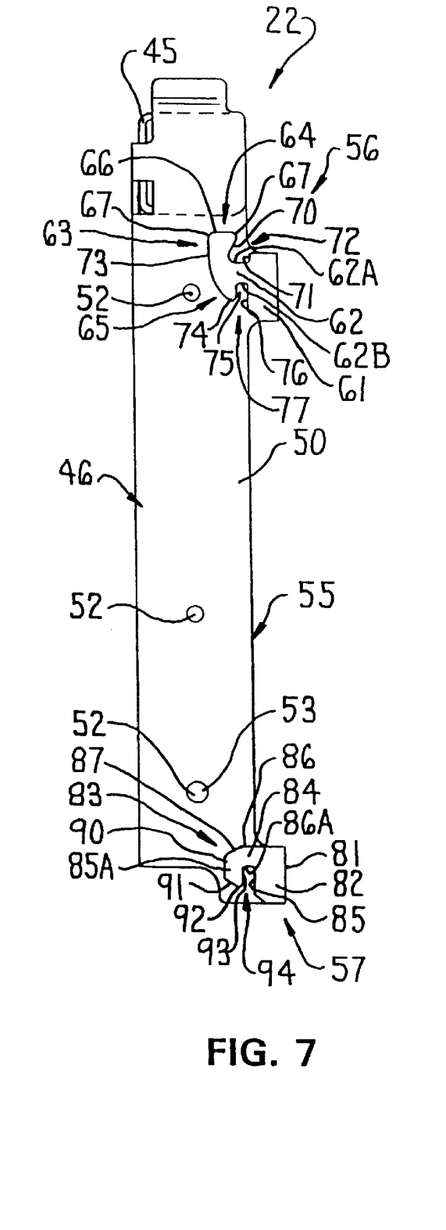
FIG. 7 is an enlarged side elevational view of the cross member.

More particularly, with reference to FIGS. 5–7, the cross member 22 includes a rigid tubular section 45 and a pair of downwardly extending and elongate connector brackets 46 joined to opposite ends thereof. Connector brackets 46 are mirror images of one another, and therefore only one such bracket 46 will be described herein. Connector bracket 46 includes generally flat rear and side walls 47 and 50 which are perpendicular with one another to provide bracket 46 with an L-shaped cross-sectional configuration. Side wall 50 has outwardly bent portions, each of which defines a boss portion 51 having a through hole 52. The lowermost boss portion through hole 52 fixedly mounts therein a threaded stud 53 which is adapted to receive a conventional nut 54 (FIG. 8) from the free end thereof.

The front vertical edge 55 of side wall 50 mounts thereon an upper hook plate 56, and a lower hook plate 57 is fixed to a lower corner of side wall 50 (FIGS. 5 and 7). The upper hook plate 56 includes a first leg part 58 which is joined to and extends outwardly from front edge 55 and is generally aligned therewith, a second leg part 60 which is perpendicular to leg part 58, and a third leg part 61 which extends from leg part 60 and is generally parallel to leg part 58. The vertical heights of the leg parts 58, 60 and 61 are similar to one another, and a small fraction of the overall vertical height of connector bracket 46.

A neck 62 of reduced vertical height (as measured between upper and lower straight edges 62A and 62B thereof) as compared to leg 61 extends rearwardly therefrom and is generally parallel to side wall 50. Neck 62 mounts thereon a hook member 63 which also extends rearwardly toward rear wall 47 in parallel with side wall 50, and which is embodied by an upwardly projecting flange 64 and a downwardly projecting flange 65.

Upper flange 64 has a substantially straight top edge 66 having rounded and generally convex corners 67 (FIGS. 7 and 10) at both ends thereof. The frontmost corner 67 joins to a front edge 70 of upper flange 64 which angles rearwardly as it projects downwardly from front corner 67 until it merges with upper edge 62A of neck 62. Front edge 70, upper edge 62A and a rearwardly facing surface 71 of leg 61 together define a generally upwardly opening recess 72. Upper flange 64 is joined to lower flange 65 through a rear edge 73 which projects downwardly from rear corner 67 and then curves forwardly until it joins a rounded end 74 which defines a lowermost extent of lower flange 65. Rounded end 74 is joined to a front edge 75 of lower flange 65, which front edge 75 at its uppermost end joins to lower edge 62B of neck 62. Front edge 75, lower edge 62B and a rear edge 76 of leg 61 together define a narrow, downwardly opening slot 77.

Lower hook plate 57 includes a first leg 80 (FIG. 12) which is joined to and angles downwardly from a lower front corner of side wall 50 and is generally aligned therewith, a second leg 81 which is joined to leg 80 so as to be generally perpendicular therewith, and a third leg 82 which extends from leg 81 and is generally parallel to leg 80. The vertical heights of the legs 80, 81 and 82 are similar to one another, and a small fraction of the overall vertical height of connector bracket 46.

An L-shaped hook member 83 extends rearwardly from a rear edge 85 of leg 82 and is generally parallel to side wall 50. The hook member 83 has an upper portion 84 which projects rearwardly toward rear wall 47 and a lower portion 85A which projects downwardly from upper portion 84 in a generally perpendicular manner. Upper portion 84 is defined by a generally straight top and bottom parallel edges 86 and 86A, which top edge 86 terminates at a beveled corner part 87. Lower portion 85A is defined by a straight vertical edge 90 which projects downwardly from beveled corner part 87, and a lower edge 91 which angles forwardly as it projects downwardly from edge 90. Lower edge 91 terminates in a rounded corner 92 which defines the lowermost extent of hook member 83, and rounded corner 92 joins to a straight and vertical front edge 93 which joins to edge 86A of upper portion 84 at its upper end. Vertical front edge 93, bottom edge 86A and rear edge 85 of leg 82 together define a narrow, downwardly opening slot 94.

Figure 8:
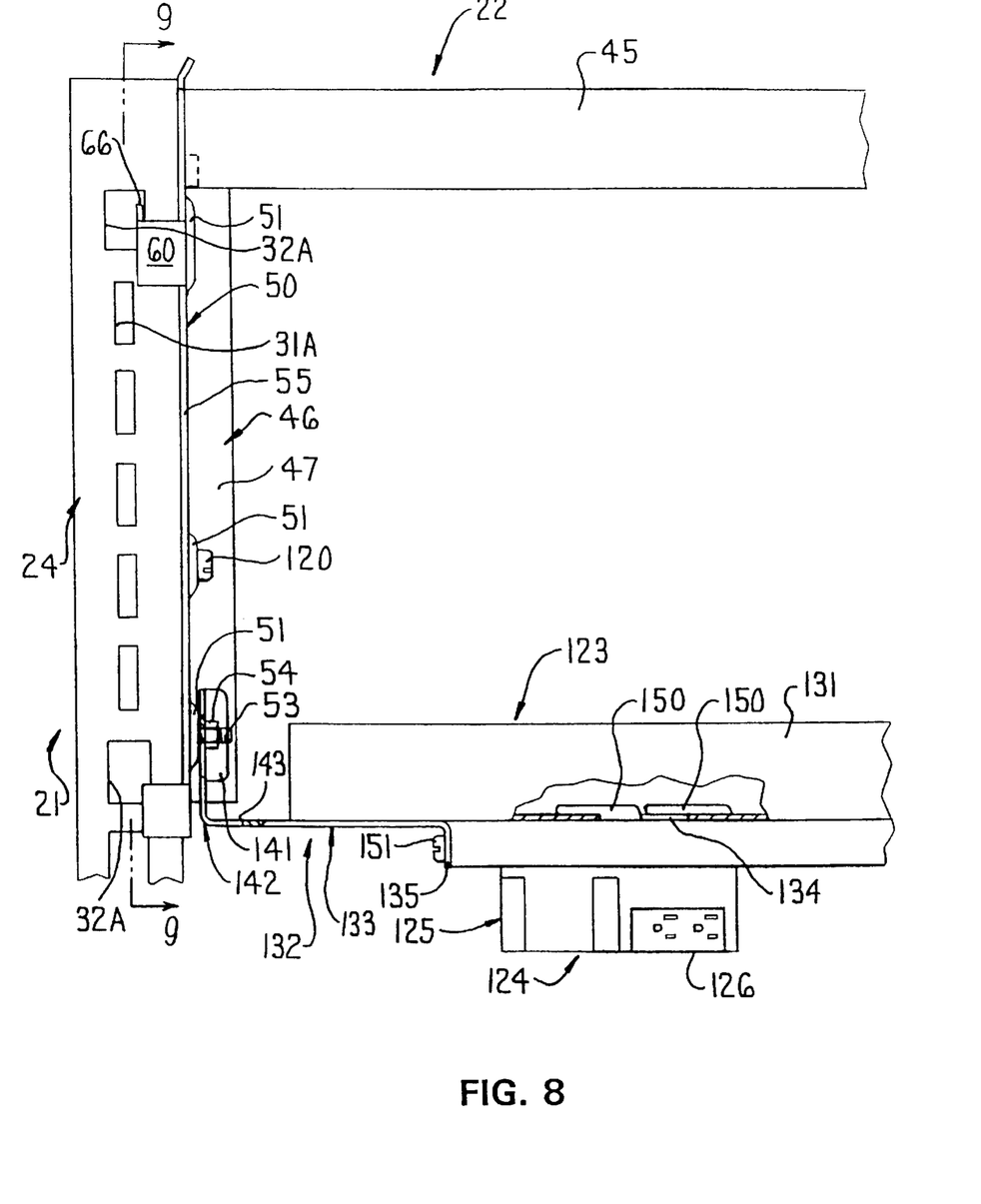
FIG. 8 is an enlarged, fragmentary view illustrating the connection of the cross member to the extension post and the connection of a cable trough the cross member, with a portion of the trough end bracket broken away.
Figures 9, 10:
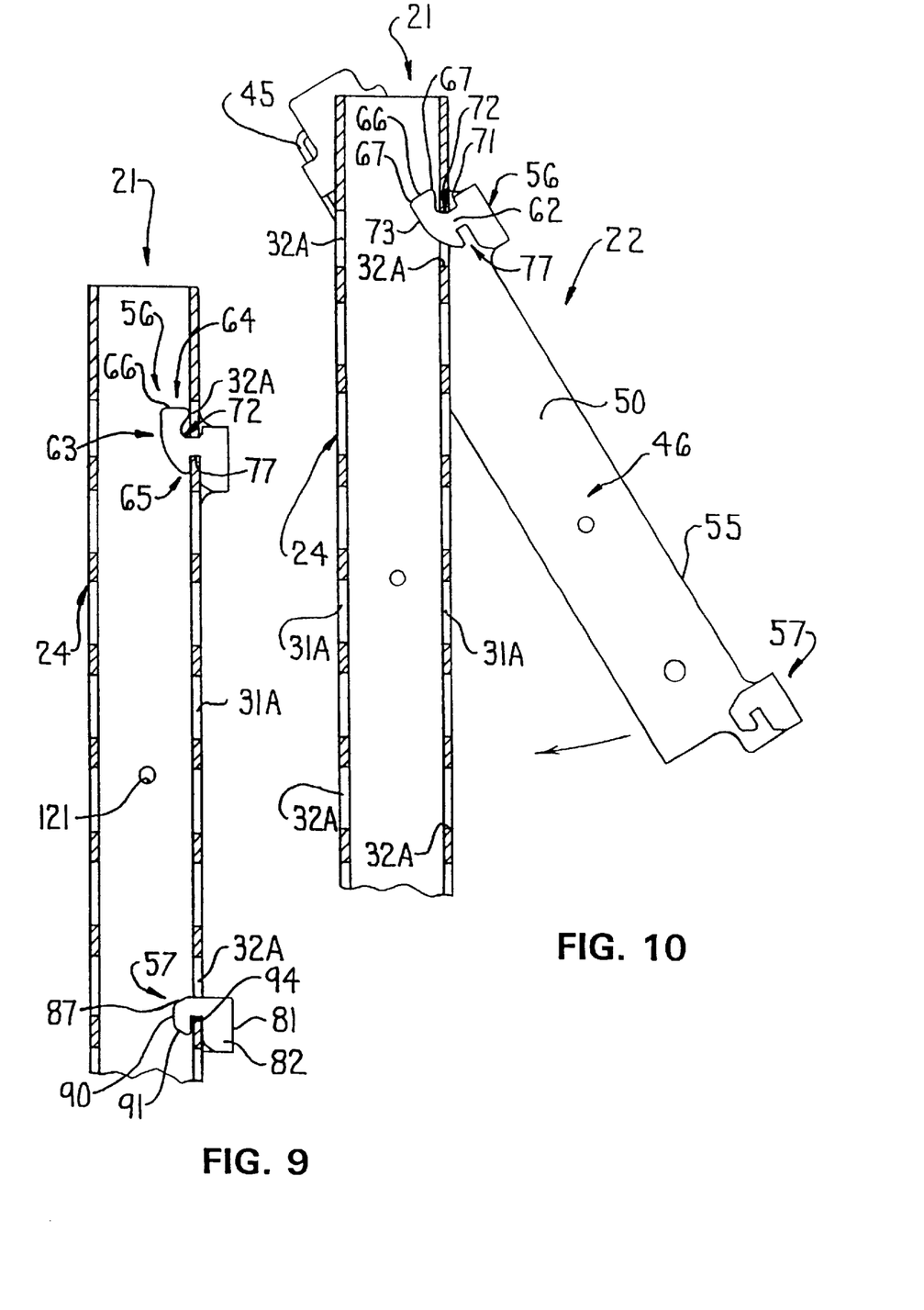
FIG. 9 is a fragmentary, cross-sectional view taken generally along line 9—9 in FIG. 8.
FIG. 10 is an enlarged, fragmentary view illustrating the assembly of the cross member to the extension post.

The cross member 22 is assembled to the extension posts 24 by generally horizontally and vertically aligning the upper hook plates 56 with the enlarged apertures 32A of the respective posts 24 while simultaneously tilting the cross member 22 and inserting the uppermost edges of posts 24 which define the apertures 32A into the recesses 72 of the upper hook plates 56 and thus into abutting contact with plates 56, as shown in FIG. 10. While maintaining the uppermost edges of openings 32A in contact with the respective upper hook plates 56, the lower end of the cross member 22 is then pivoted toward the posts 24 so as to align the lower hook plates 57 with the corresponding lower enlarged apertures 32A. The engagement of the uppermost edges of the upper apertures 32A within the respective recesses 72 defines a generally horizontal pivot axis of the cross member 22 during assembly and serves to orient brackets 46 parallel to the respective posts 24 when viewed from the front, and with continued rotation of the lower ends of brackets 46 toward the respective posts 24, also serves to vertically align the lower hook plates 57 with the corresponding lower apertures 32A until the L-shaped hook members 83 of the lower hook plates 57 are inserted into the respective lower apertures 32A. Once the lower hook plates 57 are engaged within the lower apertures 32A, the entire cross member 22 is then lowered so that the lowermost edges of the upper and lower enlarged apertures 32A engage within the respective slots 77 and 94 of the respective upper and lower hook plates 56 and 57 (FIG. 9). The cross member 22 is now rigidly fastened to the respective extension posts 24. However, to provide an even more secure fastening of cross member 22 to posts 24, a pair of lock nuts 120 (FIG. 8) are inserted into the holes 52 of the middle boss portions 51 of the respective brackets 46 and into corresponding threaded holes 121 of the respective posts 24. If desirable or necessary, an additional lock nut may be provided in hole 52 of the uppermost boss portion 51 of brackets 46 for cooperation with a corresponding threaded holes (not shown) of the respective extension posts 24.

Once assembled, the cross member 22 and the extension posts 24 define a downwardly opening U-shaped frame which is connected to the base panel assembly 13 via the bayonet connection with the lower support post 23. Additional extension panel assemblies 14 can be added vertically in the same manner and in particular, additional U-shaped frames can be formed vertically atop the other. Where two extension panel assemblies 14 are formed serially adjacent to each other, the cross members 22 are each connected to an intermediate one of the extension posts 24 which is disposed therebetween. It will be appreciated that even with the upper and lower hook plates 56 and 57 mounted within the enlarged apertures 32A of extension posts 24, the apertures 32A are sized such that they can still be utilized to receive accessory hooks.

With the cross member 22 assembled to the extension posts 24, an open interior 122 is defined by the extension posts 24, the cross member 22 and the upper base panel rail 36, which open interior 122 generally defines a beltline raceway 123A (FIG. 2). While location of the raceway 123A at beltline is desirable, it is also possible to provide electrical or communication cables in any or all of the open interiors 122 of the extension panel assemblies 14 located between the base panel and the ceiling.

Figure 11:
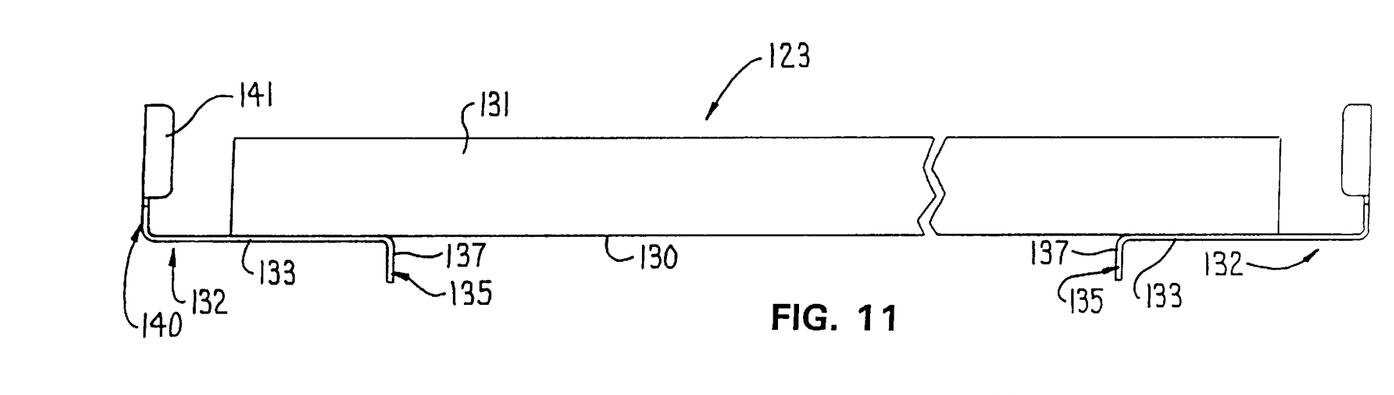
FIG. 11 is an enlarged, fragmentary side elevational view of the cable trough.
Figure 12:
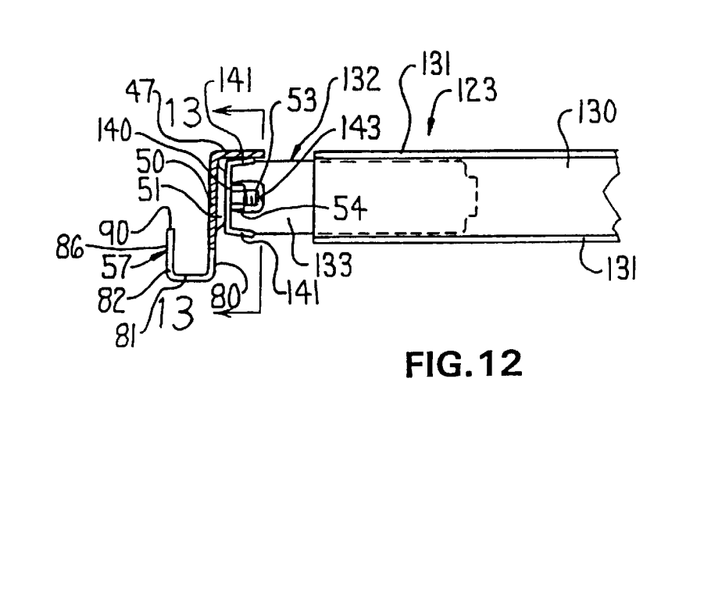
FIG. 12 is an enlarged, fragmentary cross-sectional view taken generally along line 12—12 in FIG. 4.
Figure 13:
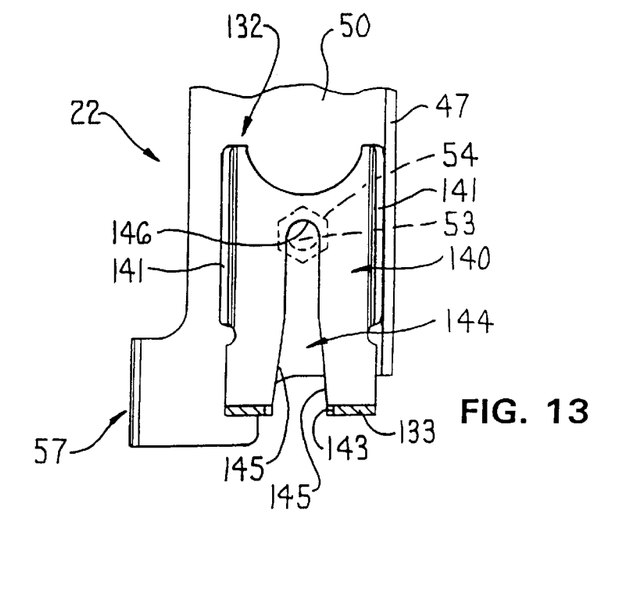
FIG. 13 is an enlarged, fragmentary cross-sectional view taken generally along line 13—13 in FIG. 12.

With reference to FIGS. 11–13, there is illustrated an elongate, generally U-shaped cable trough 123, which trough 123 may be utilized for supporting an additional PDA 124 (FIG. 8) within the beltline raceway 123A, and also permits the laying in of cabling, such as communication cabling (not shown). The additional PDA 124 includes power blocks 125 that are electrically connected with one another, and one or more receptacles 126 (only one of which is shown in FIGS. 2 and 8) selectively connected to the power blocks 125. Preferably, the cable troughs 123 of serially adjacent extension panel assemblies 14 are horizontally aligned to define a continuous trough-like passage whereby cabling can be laid therein and routed over the faces of the intermediate extension post 24 generally in the manner illustrated in '258.

Cable trough 123 includes a flat bottom wall 130 and a pair of generally parallel upright side walls 131 which extend upwardly from opposite longitudinal edges of bottom wall 130 and are generally perpendicular thereto. Bottom wall 130 defines therein a plurality of horizontally spaced-apart mounting slots 134 (FIG. 8) for a purpose as discussed below. A pair of generally L-shaped end brackets 132 are fixed to opposite ends of bottom wall 130, for example with fasteners or by welding. The end brackets 132 are identical to one another and therefore only one such bracket 132 will be described. End bracket 132 has a flat base wall 133 having an inner portion fixed to a lower surface of bottom wall 130, and an outer portion which projects a short horizontal distance from the end edge of bottom wall 130 (FIG. 12). A stop flange 135 projects downwardly from an innermost end edge of base wall 133 and is generally perpendicular thereto. Flange 135 has a through hole (not shown) defined therein, and defines an inwardly facing abutment surface 137. A planar side wall 140 projects upwardly from an outermost end edge of base wall 133 (FIG. 13) and terminates slightly above the uppermost edges of the upright side walls 131 of cable trough 123. Side wall 140 mounts thereon a pair of inwardly projecting flanges or stop walls 141 which extend in a vertical manner along opposite vertical edges of side wall 140. As shown in FIG. 11, stop walls 141 extend downwardly from the top edge of side wall 140 and terminate short of base wall 133. A slot 142 is defined in both the side wall 140 and base wall 133, which slot 142 has an L-shape when viewed in cross-section (FIGS. 12 and 13).

Slot 142 has a lower generally semi-circular part 143 defined in base wall 133 which opens outwardly through the end edge thereof (FIG. 12). Slot part 143 is of a size which permits nut 54 and stud 53 of connector bracket 46 to pass therethrough as discussed below. Slot 142 additionally includes an upper slot part 144 defined within side wall 140 which projects vertically upwardly from slot part 143 and communicates therewith. The upper slot part 144 is defined by a pair of inner edges 145 of side wall 140 which angle inwardly and toward one another as they project upwardly from the lower edge of side wall 140, which inner edges 145 then project upwardly in parallel relation with one another and terminate at a rounded edge wall 146 of side wall 140. As shown in FIG. 13, upper slot part 144 terminates at a location approximately midway along the vertical height of stop walls 141.

After the cross member 22 is assembled onto the extension posts 24, the cable trough 123 is mounted on the cross member 22 by positioning the trough 123 horizontally between the connector brackets 46 so that the L-shaped end brackets 132 and the associated slots 142 are slightly above and generally vertically aligned with the nuts 54 of the respective connector brackets 46. The trough 123 is then lowered so that the nuts 54 and the respective studs 53 pass through the lower slot part 143 and are then guided by angled edges 145, and with continued lowering of trough 123 relative to cross member 22, the studs 53 engage within the upper part of slot defined between the straight parts of inner edges 145 of side wall 140 and eventually seat against rounded edge wall 146. The nuts 54 are then tightened and the cable trough 123 is thus securely and rigidly mounted on cross member 22.

For routing of electrical power through the wall panel system 10, the additional PDA 124 is suspended from the cable trough 123 via horizontally projecting hooks 150 (FIG. 8) which engage within the corresponding mounting slots 134 of bottom wall 130. Specifically, the PDA 124 is mounted to cable trough 123 by inserting hooks 150 upwardly into the corresponding slots 134, and then sliding the PDA 124 sidewardly until the end edge thereof abuts stop flange 135. To securely fasten PDA 124 to cable trough 123, a fastener 151 is inserted into the hole defined in stop flange 135 and into a corresponding mounting hole (not shown) provided on PDA 124.

With the cable trough 123 mounted onto the cross member 22 in the manner discussed above, the rearmost stop walls 141 are in abutting contact with the rear wall 47 of the respective connector brackets 46 (FIG. 12) so that when plugs or jacks (not shown) are inserted into and removed from the receptacle 126, the rearmost stop walls 141 will prevent the cable trough 123 from twisting or rotating. The engagement of the rearmost stop walls 141 with the rear wall 47 of connector brackets 46 together function as a stop which prevents rotation of cable trough 123 relative to cross member 22. It will be appreciated that the anti-rotation feature discussed above is able to withstand approximately 40 pounds or more of insertion or removal force.

Cable reels (not shown) may be mounted to cross member 22 to assist in the management of cables such as communication cabling, which may then drop downwardly into trough 123. The various features and structural connections of both PDA assemblies briefly described herein are discussed in detail in the '258 patent, and further discussion thereof is believed unnecessary.

Once the interior framework and components of the wall panel system 11 are assembled as discussed above, upper and lower cover pads or panels 160 and 161 (FIG. 1) are respectively connected to the extension panel assemblies 14 and the base panel assemblies 13 so as to define an outer finished surface of the wall panel assemblies 12. Each lower cover panel 161 is dimensioned so as to overlie the base panel assembly 13 as well as a portion of the lower support post 23. Similarly, the upper cover panel 160 also overlies the open interior of the extension panel assembly 14 while at the same time permitting access to the electrical and communication receptacles 16 and 17 therethrough. The cover panels 160 and 161 are mounted to the panel assemblies 12 via mounting clips or brackets 162 (FIG. 2). The cover panels 160 and 161 are similar to those discussed in application Ser. No. 09/326,191, filed concurrently herewith and entitled "PAD FOR PANEL" (Attorney Docket No.: Haworth Case 286), which application is incorporated by reference herein in its entirety.

The cover panels 160 and 161 are dimensioned so that once assembled onto the wall system 11, the vertical end edges of serially adjacent pairs of cover panels are laterally spaced so as to expose the accessory apertures of the post assemblies 21 to accommodate furniture component support brackets therein.

In view of the foregoing, an office area can be subdivided into a selected configuration of workstations by appropriate positioning and connection of base panel assemblies 13 to lower support posts 23. To vary the height thereof, additional extension panel assemblies 14 can be selectively stacked onto a base panel assembly 13 by connection of a suitable number of panel extension posts 24 onto the lower support post 23, and thereafter connecting a cross member 22 according to the invention therebetween.

It will be appreciated that the cable trough 123 is readily mountable onto cross member 22, since trough 123 simply slides over the nuts 54 and seats upon the respective stems 53 thereof, and requires a tool only to tighten nuts 54 as discussed above. Further, the cross member 22 can be easily and readily mounted onto the post assemblies 21, and requires a tool only to tighten the lock nut 120 into post 24. In addition, the mounting of the cross member 22 to the posts 24 utilizing the hook plates 56 and 57, and the side walls 50 of brackets 46 which overlie the respective side faces of the posts 24 provides structural rigidity to the system 11, and particularly lateral rigidity.

It will also be appreciated that the cross member 22 according to the invention may be utilized with a post-type stackable panel system as disclosed herein, but may also be utilized with a rectangular frame utilized in conventional panel-to-panel wall systems, which rectangular frame includes upright end rails defining vertical rows of slots therein. Further, the cross member 22 and post assemblies 21 may also be utilized in conjunction with a post-type panel system including full size panels such as that disclosed in the '689 application mentioned hereinabove.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A frame arrangement for supporting a panel assembly of a space-dividing wall system, said arrangement comprising:

a pair of upright vertically elongate support members;

a first cross member extending laterally between upper ends of said support members and including a generally horizontally oriented elongate upper section and a pair of legs which project downwardly from opposite ends of said upper section, each said leg being fixed to one of said support members and including a first side wall disposed in generally superimposed relation with an inwardly facing side wall of the respective support member and a second side wall which is transverse to said first side wall and which projects inwardly and away from the respective support member;

a second cross member disposed below said first cross member and extending generally horizontally between said legs, said second cross member having an upwardly-opening generally U-shaped configuration for supporting cabling therein and being adapted to mount an electrical component along a lower portion thereof, and a flange disposed at each end of said second cross member and engaging said second side wall of the respective leg to prevent rotation of said second cross member during manipulation of the electrical component.

2. The frame arrangement of claim 1 wherein each said second side wall projects inwardly from a vertical edge of the respective first side wall and is perpendicular thereto, and each said flange is vertically oriented and disposed in generally parallel and superimposed relation with the respective second side wall.

3. The frame arrangement of claim 2 wherein said first side walls mount thereon a stud which projects inwardly therefrom, said ends of said second cross member respectively mount thereon an L-shaped bracket defined by a lower horizontal wall disposed in supportive engagement with a lower side of said second cross member and an upper vertical wall which projects upwardly from a terminal edge of said lower horizontal wall, said upper vertical walls each defining a slot therein in which the respective studs are engaged to securely mount said second cross member between said legs.

4. The frame arrangement of claim 3 wherein a pair of said flanges which are generally parallel to one another project inwardly from respective vertical edges of said upper vertical wall of the respective bracket.

5. The frame arrangement of claim 1 wherein each said support member includes an outwardly facing side wall oriented transversely relative to said inwardly facing side wall thereof, said outwardly facing side walls each defining therein an opening and including vertically spaced first and second edges which respectively define a lower extent and an upper extent of said opening, said legs each including a hook element which projects outwardly from a vertical side edge of said first side wall in a direction opposite to said second side wall and defines an upwardly opening recess and a downwardly opening slot, said hook elements engaging within the respective openings defined in said outwardly facing side walls of the respective support members such that said first edges of said openings engage within the respective slots to secure said first cross member to said support members, said second edges being engaged within the respective recesses during assembly of said first cross member to said support members.

6. The frame arrangement of claim 5, wherein said hook elements are upper hook elements, said openings are first openings, and said outwardly facing side walls of said support members each define therein a second opening spaced vertically below the respective first opening, each said leg mounting thereon a lower hook element vertically spaced from the respective upper hook element, said lower hook elements each defining a downwardly opening slot which engages with an edge defining the lower extent of the respective second opening.

7. The frame arrangement of claim 5, wherein said upwardly opening recess of said hook element is defined in part by an upright projection which is insertable into a respective one of said openings when said legs are disposed in a tilted position so as to extend outwardly away from said support members, said projections being insertable sidewardly into the respective openings when said legs are in the tilted position.

8. The frame arrangement of claim 7, wherein said projections are insertable into said openings and cooperate with said second edges thereof to define a horizontal pivot axis about which said legs are pivotable downwardly from said tilted position to an installed position.

9. The frame arrangement of claim 8, wherein said hook elements are shiftable vertically within said openings between a raised position and a lowered position after said legs have been pivoted to said installed position, said downwardly opening slots of said hook elements being movable sidewardly into said openings during movement from said tilted position to said installed position, said hook elements being shiftable vertically downwardly from said raised position to said lowered position to engage said slots with said first edges of said openings.

10. A frame arrangement for supporting a panel assembly of a space-dividing wall system, said arrangement comprising:

a pair of upright vertically elongate support members;

a first cross member extending laterally between upper ends of said support members and including a generally horizontally oriented elongate upper section and a pair of legs which project downwardly from opposite ends of said upper section, each said leg being fixed to one of said support members and including first and second side walls which are transverse to one another;

a second cross member disposed below said first cross member and extending generally horizontally between said legs, said second cross member having an upwardly-opening generally U-shaped configuration for supporting cabling therein and being adapted to mount an electrical component along a lower portion thereof, and a flange disposed at each end of said second cross member and engaging one of said side walls of the respective leg to prevent rotation of said second cross member during manipulation of the electrical component, the other said side walls of the respective legs mounting thereon an inwardly projecting stud, and said ends of said second cross member each mounting thereon a bracket having an upright wall which defines a downwardly opening slot therein, said walls each including an edge which defines the upper extent of the respective slot, said studs engaging said edges of the respective slots to support said second cross member on said first cross member.

11. The frame arrangement of claim 10 wherein said brackets have an L-shape defined by said upright wall and a bottom wall which projects generally horizontally from a lower edge thereof, said slot having a first vertically oriented slot part defined in said upright wall and a second horizontally oriented slot part defined in said bottom wall in communication with said first slot part, and said second slot part is of a size sufficient to permit the respective studs to pass therethrough when said second cross member is positioned between said support members and vertically lowered over said studs.

12. The frame arrangement of claim 10 wherein said flange projects from an upright vertical end edge of said bracket wall adjacent said one side wall and said flange is generally perpendicular with said bracket wall.

* * * * *